Oct. 7, 1952     W. N. YEGGY     2,612,929
TRACTOR GUIDE TIRE
Filed Dec. 23, 1947
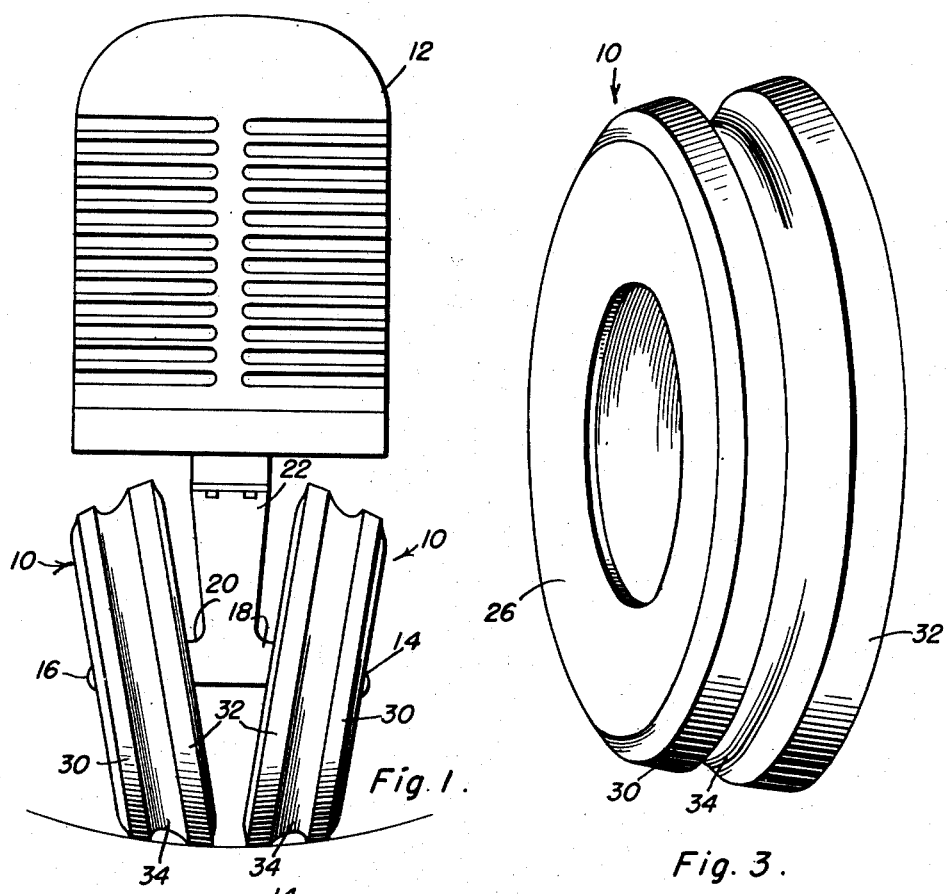
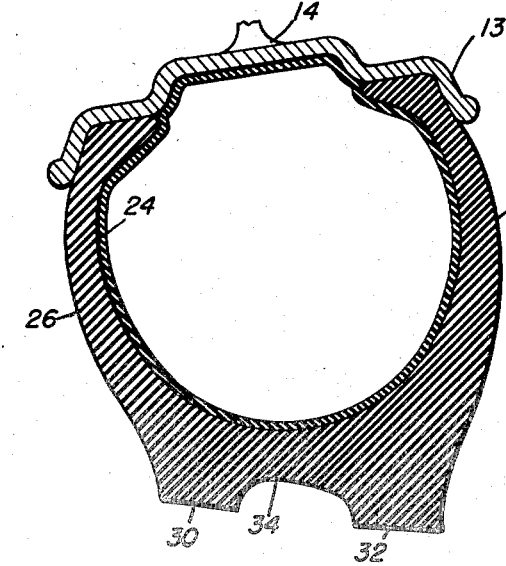
Wilfred N. Yeggy
INVENTOR.

Patented Oct. 7, 1952

2,612,929

UNITED STATES PATENT OFFICE 2,612,929

TRACTOR GUIDE TIRE

Wilfred N. Yeggy, Solon, Iowa

Application December 23, 1947, Serial No. 793,553

2 Claims. (Cl. 152—209)

This invention relates to a guide tire for a tractor and is designed and adapted for use on the front wheels of a tractor to guide the tractor in cultivation of the soil and especially adapted for employment in mud lodged fields for cultivating row crops.

An object of this invention is to improve the steering of the guide wheels of a tractor and to carry the steering load closer to a centrally disposed steering column.

Another object of this invention is to guide a tractor in a uniform path without danger of side slippage.

Another object of this invention is to prevent the intrusion of mud under the wheels and the attendant lodgment of the mud within the inwardly opposed surfaces of the guide wheels to obviate damage or injury to the dust seals or bearings of the wheels.

Another object of this invention is to provide a tire that is simple and inexpensive to manufacture, durable and efficient in operation and adapted for use under any operating conditions.

With these and ancillary objects in view, this invention consists of certain novel features of construction and arrangement of parts as will be more clearly seen in the following description and in the accompanying drawings, wherein:

Figure 1 is a front elevation of two tires embodying this invention mounted on the front axle of a tractor;

Figure 2 is a perspective view of the tire shown generally in use in Figure 1; and, Figure 3 is a cross-sectional view of the same embodiment of this invention, as shown in Figure 2.

This invention relates to a pneumatic tire arranged and constructed in a fashion to be particularly adapted for use on the guide wheels of a tractor. As shown in the drawings, wherein similar characters of reference refer to similar parts throughout, and in particular, Figure 1 therein, one embodiment of this invention, generally denoted by the numeral 10, is shown employed with a tractor 12. The tires 10 are mounted on the rims 13 of pilot or guide wheels 14 and 16, which are angled at a substantial angle with respect to each other and to a vertical plane midway between them. The wheels are supported on spindles 18 and 20 for steering movement and controlled by steering column 22.

The tire 10 comprises a carcass 24 of suitable material such as fabric, rubber, or rubberized fabric. Side walls 26 and 28 are provided of usual construction with wall 28 being formed of a larger diameter than wall 26 and adapted to be positioned on the wheel so as to face inwardly, for a purpose to be hereinafter discussed. The side walls are formed smooth so as to prevent or retard the surrounding mud in a water soaked field from adhering on or between the tire.

Located concentrically around the periphery of the side walls and arranged and constructed to form substantially continuations thereof and a tread portion therefor are rings or ribs 30 and 32.

Ring 30 is of a lesser diameter similar to the outer dimensions of side wall 26 and is formed around the periphery of side wall 26. Ring 32 is of a larger diameter and is formed around the periphery of wall 28. This higher ring 32 formed on one side of the tire 10 generally bears the entire load of the tractor and the smaller ring 30 does not quite touch the ground at all times. An elongated arcuate or elliptical channel 34 is formed on the tread portion of the tire midway between the inner side faces of the rings.

In operation, two tires, similar to tire 10, are positioned on the pilot or guide wheels 14 and 16 of a tractor, as substantially shown in Figure 1 of the drawings. It can be seen from the drawing that by facing the higher rings 32 inwardly and directly opposite each other, the steering load is carried closer to the center of the centrally located steering column 22. This also results in an outward placement of the mud around the tire and prevents lateral displacement of the tractor as the higher ring 32 would break or drag offering substantial resistance to deter the side slippage.

It can thus be seen that a simple and inexpensive tire constructed for durable and efficient operation and adapted for use to perform definite objectives under any types of operating conditions has been provided.

It is believed that the foregoing description is sufficient to enable those skilled in the art to understand and appreciate the structure and operation so a further and more detailed description is not deemed needed.

Of course, it is to be understood that the embodiment shown and described is for the purpose of affording an understanding of one form of tire in which this invention may be embodied and it is understood that certain changes in style, size or structure, not amounting to invention, may be made without any departure from the spirit of the invention or the scope of the appended claims.

Having described the invention what is claimed as new is:

1. In a tractor steering assembly including a pair of vertically complemental opposed inclined guide wheels of the type provided with inflatable casings converging at their lower extremities; an improvement comprising a pair of axially spaced, radially extending annular ribs on the periphery of each of said casings, the inner rib of each of said pairs of annular ribs being of substantially larger diameter than the respective outer rib and being arranged immediately adjacent the adjacent sides of the casings and having side edges smoothly merging with said adjacent sides of the casings.

2. For use in chosen pairs of duplicate companion tractor wheels such as are used in a tractor steering assembly and wherein said wheels are guide wheels which are disposed in downwardly and inwardly converging relationship for required toed-in results; a pair of left and right pneumatic tires, each tire embodying an inflatable casing having beaded side walls joined by a complemental connective tread wall, the latter having an integral pair of axially spaced, radially extending annular tracking ribs on its peripheral surface, said ribs having flat traction surfaces and defining a single endless channel between themselves, there being an inner rib and an outer rib, the inner rib being of substantially larger diameter than the outer rib and the outer sides of the respective ribs being immediately adjacent to the corresponding side walls of the casing and merging smoothly into their respective side walls.

WILFRED N. YEGGY.

REFERENCES CITED

The following references are of record in the file of this patent:

UNITED STATES PATENTS

| Number | Name | Date |
| --- | --- | --- |
| 647,484 | Dorr | Apr. 17, 1900 |
| 956,928 | Bonnet | May 3, 1910 |
| 2,175,965 | Madden | Oct. 10, 1939 |
| 2,207,780 | Brown | July 16, 1940 |
| 2,281,359 | Kenner | Apr. 28, 1942 |
| 2,340,258 | Brunner | Jan. 25, 1944 |

FOREIGN PATENTS

| Number | Country | Date |
| --- | --- | --- |
| 38,887 | Norway | Nov. 10, 1924 |